United States Patent [19]
Everett

[11] Patent Number: 4,922,643
[45] Date of Patent: May 8, 1990

[54] ILLUMINATED FISHING FLOAT

[76] Inventor: Charles J. Everett, 18 Stonehill Dr., Killingworth, Conn. 06417

[21] Appl. No.: 395,092

[22] Filed: Aug. 17, 1989

[51] Int. Cl.⁵ .............................................. A01K 93/00
[52] U.S. Cl. ...................................... 43/17.5; 43/44.87
[58] Field of Search ................... 43/17.5, 44.87, 44.92, 43/44.95, 44.9, 44.91

[56] References Cited

U.S. PATENT DOCUMENTS

| | | | |
|---|---|---|---|
| | 10/1951 | Aldinger | 43/44.91 |
| 2,699,624 | 1/1955 | Vawryk | 43/44.87 |
| 2,791,060 | 5/1957 | Kender | 43/44.9 |
| 3,041,771 | 7/1962 | Hreno | 43/17.5 |
| 3,217,746 | 11/1965 | Voisine | 137/614.04 |
| 3,693,278 | 9/1972 | Mahone, Jr. | 43/17.5 |
| 3,798,822 | 3/1974 | Lampus | 43/17.5 |
| 3,913,256 | 10/1975 | Morris et al. | 43/17.5 |
| 4,010,567 | 3/1977 | MacMillan | 43/17.5 |
| 4,070,784 | 1/1978 | Yokogawa et al. | 43/17.5 |
| 4,157,627 | 6/1979 | Tschelisnik | 43/17.5 |
| 4,234,913 | 11/1980 | Ramme | 362/158 |
| 4,291,484 | 9/1981 | Young | 43/17.5 |
| 4,426,803 | 1/1984 | Helling | 43/17.6 |
| 4,437,256 | 3/1984 | Kulak | 43/17.5 |
| 4,461,114 | 7/1984 | Riead | 43/17.5 |
| 4,516,349 | 5/1985 | Klocksiem | 43/17.5 |
| 4,621,447 | 11/1986 | Rhodes | 43/17.5 |
| 4,658,532 | 4/1987 | McFarland et al. | 43/17.5 |
| 4,748,761 | 6/1988 | Machovina | 43/17.5 |
| 4,760,664 | 8/1988 | Amendola | 43/17.5 |

FOREIGN PATENT DOCUMENTS 0483112  5/1952  Canada .................................. 43/44.9
0793075  12/1954  Canada .................................. 43/44.9

Primary Examiner—Richard K. Seidel
Assistant Examiner—James Miner
Attorney, Agent, or Firm—Robert H. Montgomery

[57] ABSTRACT

A hollow illuminated fishing bobber of generally spherical shape, comprising two substantially hollow hemispherical shell members with cooperating joining means on each of the shell members for joining the shell members together to form the generally spherical shape and with an annular sealing member interposed between the shell members, a lamp member having elongated electrical leads, one of the shell members is adapted to be the upper member and has apertures therethrough for receiving the lamp leads. An elastic pocket member is disposed within the hollow bobber receiving a disc type battery therein having terminals on either side thereof where the lamp leads extend into the pocket member on either side of the battery and are frictionally held in contact with the battery by the pocket member. The two shell members are identical and each defines an inner annular shoulder adjacent the open ends thereof. The annular sealing member is disposed between the shoulders and the cooperating locking means on each of the shell members locks the shell members together with the sealing member compressively received therebetween, whereby the bobber is sealed against ingress of water therein.

14 Claims, 1 Drawing Sheet

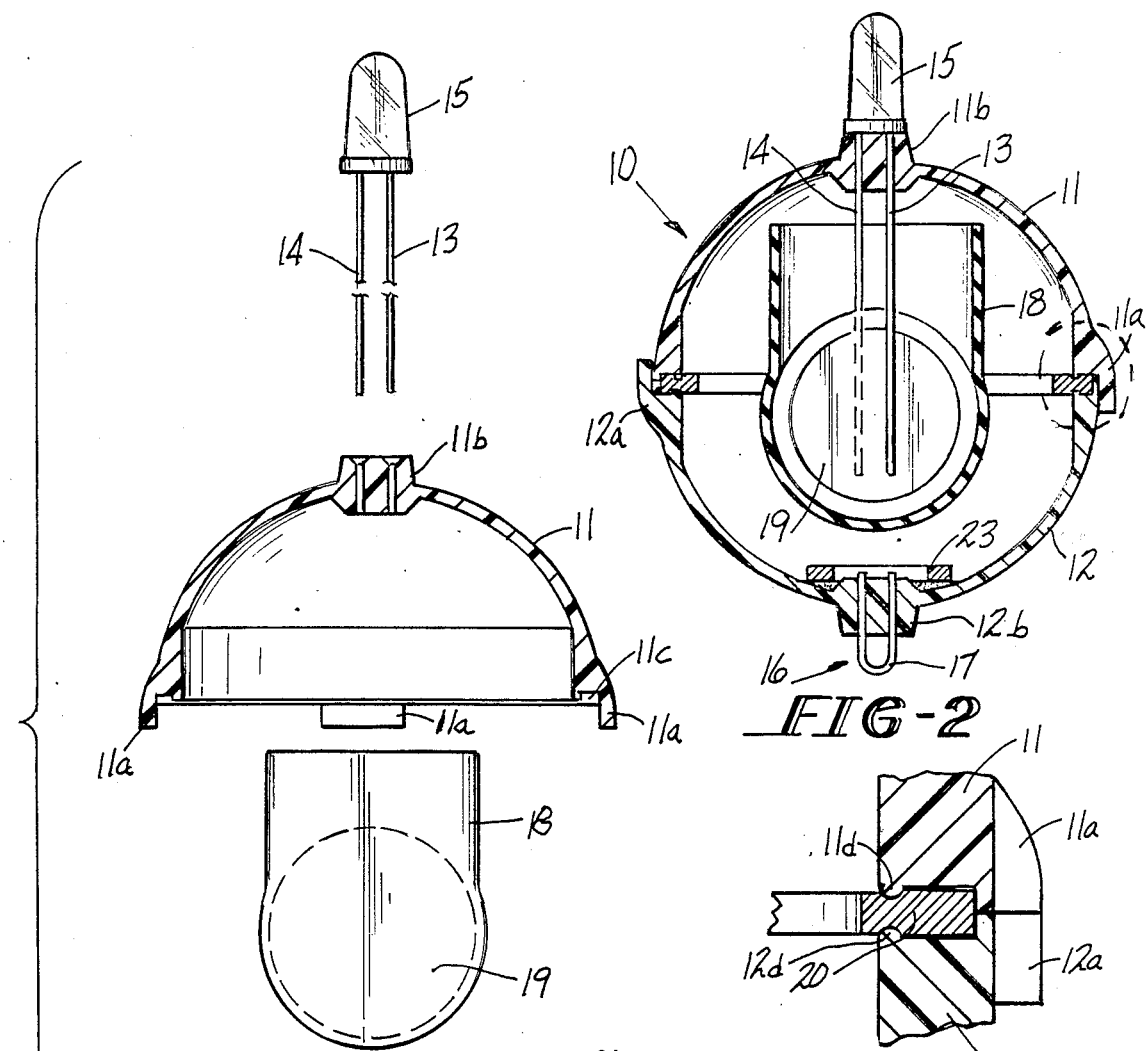
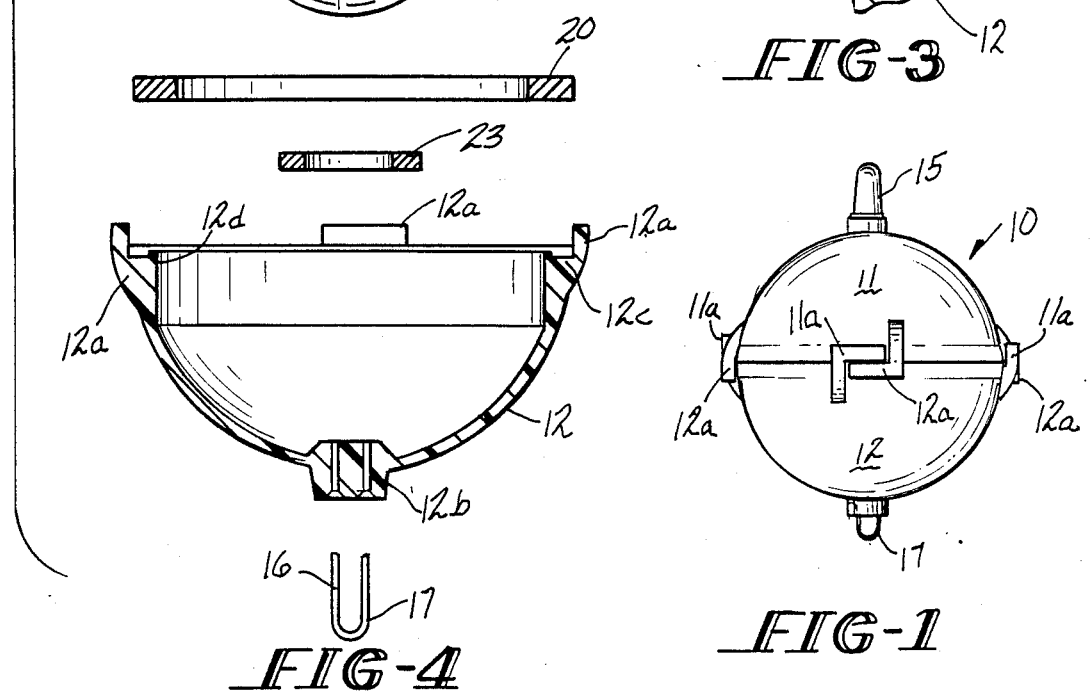

ILLUMINATED FISHING FLOAT

FIELD OF THE INVENTION

This invention relates to illuminated fishing floats and more particularly relates to flashing fishing floats.

BACKGROUND OF THE INVENTION

Illuminated fishing floats for use by night fisherman are known. Such floats are sometimes called bobbers and are used to alert a fisherman to a strike should the illuminated bobber disappear. The fishing bobbers of the type to which the present invention relates are disclosed in U.S. Pat. No. 3,041,771 which discloses two generally hemispherical portions where one is frictionally fitted to the other and a battery and lamp are contained within the closed structure. The structure of this patent requires a clear or translucent housing as much as the lamp is contained with in the housing. U.S. Pat. No. 3,913,256 also discloses a generally spherical fishing float containing a battery and a lamp. Other U.S. patents disclosing generally spherical bobbers with illumination are 3,693,278; 4,516,349; 4,658,532; 4,748,761 and 4,760,664. In some of these bobbers a lamp is utilized to attempt to attract the fish either in the bobber itself or is attached to a separate lure.

In an illuminated fishing bobber to alert a night fisherman as to whether a strike has occurred as may be determined by disappearance of the illuminated bobber if a strike occurs, it is important that it be sealed so that neither the battery nor the lamp is subjected to short circuiting by ingress of water into the float.

Accordingly, the present invention provides a new and improved flashing fishing bobber of economical and efficient construction and long life in which the battery may be readily disconnected from a lamp when the bobber is not in use.

SUMMARY OF THE INVENTION

Briefly stated, the invention in one form thereof comprises two generally hemispherical shells each having a boss at one end thereof. Both of the bosses have a pair of apertures therethrough. The boss of the upper shell is arranged to receive a flashing light emitting diode (LED) whose leads are insulatingly sealed as they extend through the boss to the interior of the structure. The lower hemispherical shell boss is adapted to receive in a force fit a generally U-shaped member which provides an eyelet for attachment to a fishing line. Both hemispherical shells have mating interlocking means thereon for attachment to each other, and each at its open end has a shoulder defined therein adapted to receive a sealing ring. The battery is of the disk type and is received in a pocket member. Leads from the LED extend into the pocket member on either side of the battery and are thereby energized. The pocket frictionally holds the leads in contact with the battery terminals. When not in use the bobber sections may be disassembled and the battery very easily removed from the LED leads. The pocket with the battery therein is designed to extend below the junction of the two hemispherical shells and lower the center of gravity of the overall bobber.

An object of this invention is to provide a new and improved illuminated and water tight fishing bobber.

Another object of this invention is to provide an illuminated fishing bobber of new, improved, two piece construction, which may be easily assembled and disassembled.

A further object of this invention is to provide a spherical illuminated fishing bobber where the fishing bobber is formed into generally hemispherical shells which are efficiently sealed to prevent ingress of water into the bobber.

The features of the invention which are believed to be novel are particularly pointed out and distinctly claimed in the concluding portion of this specification. The invention, however, together with further objects and advantages thereof may best be appreciated by reference to the following detailed description taken in conjunction with the drawings.

BRIEF DESCRIPTION OF THE DRAWINGS

FIG. 1 is an elevation of a fishing bobber embodying the invention.

FIG. 2 is an enlarged vertical section of FIG. 1.

FIG. 3 is an enlarged view of a portion of FIG. 2 shown encircled in a dotted line in FIG. 2.

FIG. 4 is an exploded view of the bobber shown in FIG. 1 and FIG. 2.

DETAILED DESCRIPTION OF A PREFERRED EMBODIMENT OF THE INVENTION

Referring to all of the Figures, the invention comprises a illuminated hollow fishing float or bobber 10 which generally comprises two identical parts, substantially a hemispherical hollow upper shell 11 and a mating lower shell 12. The shells are locked together by mating L-shaped lugs 11a and 12a on the shells 11 and 12, respectively, to provide a water tight seal between the two shells 11 and 12, as will hereinafter be described. The lugs have a vertical leg and a horizontal leg for cooperative interlocking.

Each of the shells has a boss 11b and 12b, each with two openings or apertures therethrough. The bosses 11b and 12b are both on what maybe referred to as a vertical or North-South axis. Shell 11 receives through the apertures in boss 11b leads 13 and 14 of a lamp in the form preferably of a light emitting diode (LED) 15. The leads 14 and 13 pass through the passages of boss 11b and are sealed therein by a water tight adhesive which also adheres the LED 15 to the top of boss 11b and prevents any ingress of water into the bobber, or short circuiting of leads 13 and 14. The lower boss 12b receives in its apertures a U-shaped member 16 with legs that are force fitted into the apertures in boss 12b and provide an eyelet 17 for attachment to a fishing line. The force fitting prevents any ingress of water.

Disposed within the float 10 is a pocket 18, which is preferably formed of an elastic material usually in the form of plastic, and receives therein a disk type battery 19 which is preferably in the form of a lithium three volt battery with terminals on either side thereof. The battery is supported by frictional engagement of leads 13 and 14 in pocket 18 on either side of the battery. The pocket and the battery are so positioned that center of gravity of the battery extends below the juncture of hemispherical shells 11 and 12. The leads 13 and 14 of lamp 15 extend into the pocket on either side of the battery and are in electrical contact therewith so that the battery may energize the lamp.

If the shells 11 and 12 should be disengaged, the pocket 18 and battery 19 therein will remain in contact with leads 13 and 14, but may be easily disengaged so that the battery is not unnecessarily drained.

Shell 11 has an inner shoulder 11c defined thereon adjacent to its open edge together with an upstanding angular flange 11d. Flange 11d is generally perpendicular to shoulder 11c. Similarly, shell 12 has an inner shoulder 12c therein adjacent its open edge with an upstanding flange 12d. Flange 12d is generally perpendicular to shoulder 12c. The shoulders 11c and 12c are designed to receive therein an annular seal 20 which is compressively engaged by the flanges 11d and 12d as well as shoulders 11c and 12c. The flanges will bite into the seal. Thus, when the two shells 11 and 12 are connected together by the L-shaped members 11a and 12a the flanges 11d and 12d will compressably engage or bite into a seal 20 and provide a water tight seal between shells 11 and 12.

If desired, a weighting member in the form of a washer 23 may be adhered to the bottom shell 12 to further insure that the center of gravity of the float 10 is below the joining lines of the shells 11 and 12 and the device 10 will remain in an upright position. However, such upright position is also maintained by putting the center of gravity of the battery 19 below the joining lines of the shells 11 and 12.

The pocket 18 is such that the leads 13 and 14 will at all times be kept in an engagement with either side of battery 19 when the float 10 is operational. However, when the float is not intended to be operational the two shells 11 and 12 may easily be disengaged by rotative motion and the leads 13 and 14 of the lamp disengaged from battery 19 to prevent unnecessary drain on battery 19.

A significant feature of the invention is the manner in which the lamp 15 is connected to battery 19. The elongated leads 13 and 14 are frictionally held in electrical contact with battery 19 by pocket member 18. This eliminates the need for any dedicated battery terminals or interior construction to receive and hold a battery, particularly one of the cylindrical or rectangular type.

A fishing line may be passed through eyelet 17 and attached thereto. If a night fisherman is utilizing a device as described, he may easily discern that the illuminating bobber has been pulled beneath the surface of the water inasmuch as he will not longer observe the illumination or flashing of lamp 15. This will alert the fisherman to the fact that a strike has occurred and he may either begin reeling in or playing the fish strike. It is further preferred that the lamp or LED 15 be of the color red inasmuch as red light attenuates most rapidly below the water.

For simplicity and economy of construction both shells are molded identically. Seal 20 is preferably adhered to lower shoulder 12c and retained in place when the shells are not connected.

It may thus be seen that the objects of the invention set forth, as well as those made apparent from the foregoing description, are efficiently attained. While a preferred embodiment of the invention has been set forth for the purpose of the disclosure, modification to the disclosed embodiment of the invention, as well as other embodiments thereof, may occur to those skilled in the art. Accordingly, the appended claims are intended to cover all embodiments of the invention and modifications to the disclosed embodiments which do not depart from the spirit and scope of the invention.

What is claimed is:

1. A hollow illuminated fishing bobber of generally spherical shape, comprising two substantially hollow hemispherical shell members, cooperating joining means on each of said shell members for joining said members together to form said generally spherical shape, sealing means interposed between said shell members, a lamp member having elongated electrical leads, one of said shell members adapted to be the upper member having apertures therethrough for receiving said leads, an elastic pocket member within said hollow bobber, said pocket member receiving a disc type battery therein having terminals on either side thereof, said leads extending into said pocket member on either side of said battery and frictionally held between said battery and said pocket member.

2. The bobber of claim 1 where said battery in said pocket has a center of gravity below the center of gravity of said bobber.

3. The bobber of claim 1 where said shell members are identical in configuration.

4. The bobber of claim 1 where said shell members are upper and lower and said upper shell member has a boss defined thereon, said apertures extending through said boss, said lamp being sealed to said boss to protect against ingress of water to said leads.

5. The bobber of claim 4 where said lower shell is identical to said upper shell with apertures through the boss, a U-shaped member having legs force fitted into the apertures of the boss of said lower shell and defining an eyelet for attachment of a fishing line thereto.

6. A hollow fishing bobber comprising two identical generally hemispherical shell members, each of said shell members defining an inner annular shoulder adjacent the open ends thereof, an annular sealing member disposed between said shoulders, cooperative locking means on each of shell members adapted to lock said shell members together with said sealing member therebetween, whereby said bobber is sealed against ingress of water therein, said cooperative locking means comprising L-shaped members having horizontal and vertical perpendicular legs where the horizontal legs engage and lock said shells together and compress said sealing member.

7. The bobber of claim 6 where said shoulders have an inner upstanding annular flange thereon which bite into said sealing member on either side thereof.

8. A hollow fishing bobber comprising two identical generally upper and lower hemispherical shell members, each of said shell members defining an inner annular shoulder adjacent the open ends thereof, an annular sealing member disposed between said shoulders, cooperative locking means on each of shell members adapted to lock said shell members together with said sealing member therebetween, whereby said bobber is sealed against ingress of water therein, each of said shells having a boss defined thereon at diametrically opposed upper and lower positions when said bobber is assembled, said boss of said upper shell member having a lamp secured thereto with leads extending through said boss into said bobber, a pocket member within said bobber receiving a disc type battery therein having terminals on either side thereof, said leads extending into said pocket member on either side of said battery and frictionally held therein between said pocket and said battery terminals.

9. The bobber of claim 8 where said battery in said pocket has a center of gravity below the center of gravity of said bobber.

10. The bobber of claim 8 wherein said lower shell member has a U-shaped member having legs force fitted into apertures of the lower member boss and defining eyelet for attachment of a fishing line thereto.

11. The bobber of claim 8 where said cooperative locking means are L-shaped members having horizontal and vertical perpendicular legs where the horizontal legs engage and lock said shells together and compress said sealing member.

12. The bobber of claim 8 where said shoulders have an inner upstanding annular flange thereon which bite into said sealing member on either side thereof.

13. A hollow illuminated fishing bobber comprising two hollow members, means joining said members together to form said bobber, sealing means interposed between said members, a lamp member having elongated electrical leads, one of said members adapted to be the upper member having apertures therethrough for receiving said leads, an elastic pocket member within said hollow bobber, said pocket member receiving a disc type battery therein having terminals on either side thereof, said leads extending into said pocket member on either side of said battery and frictionally held between said battery and said pocket member.

14. The bobber of claim 13 where said battery in said pocket has a center of gravity below the center of gravity of said bobber.

* * * * *